US010794564B2

(12) United States Patent
Fukui et al.

(10) Patent No.: US 10,794,564 B2
(45) Date of Patent: Oct. 6, 2020

(54) BACK DOOR HANDLE DEVICE

(71) Applicants: TOYODA GOSEI CO., LTD., Kiyosu-shi (JP); TOYOTA JIDOSHA KABUSHIKI KAISHA, Toyota-shi (JP)

(72) Inventors: Hirotaka Fukui, Kiyosu (JP); Koji Tatematsu, Kiyosu (JP); Atsushi Obata, Nagakute (JP); Kakeru Nemoto, Toyota (JP)

(73) Assignees: TOYODA GOSEI CO., LTD., Kiyosu-Shi, Aichi-Ken (JP); TOYOTA JIDOSHA KABUSHIKI KAISHA, Toyota-Shi, Aichi-Ken (JP)

( * ) Notice: Subject to any disclaimer, the term of this patent is extended or adjusted under 35 U.S.C. 154(b) by 0 days.

(21) Appl. No.: 16/694,855

(22) Filed: Nov. 25, 2019

(65) Prior Publication Data

US 2020/0173627 A1   Jun. 4, 2020

(30) Foreign Application Priority Data

Nov. 30, 2018   (JP) ................. 2018-225106

(51) Int. Cl.
| | |
|---|---|
| *B60Q 1/00* | (2006.01) |
| *B60Q 1/26* | (2006.01) |
| *B60Q 11/00* | (2006.01) |
| *F21S 43/20* | (2018.01) |
| *E05B 81/76* | (2014.01) |
| *B60Q 1/56* | (2006.01) |

(Continued)

(52) U.S. Cl.
CPC ............... *F21S 43/26* (2018.01); *B60Q 1/56* (2013.01); *E05B 81/76* (2013.01); *F21S 43/27* (2018.01); *B60J 5/10* (2013.01); *E05Y 2900/531* (2013.01); *E05Y 2900/546* (2013.01)

(58) Field of Classification Search
CPC .. B60Q 1/56; F21S 41/141–155; F21S 41/24; F21S 41/28–29; F21V 5/008–043
USPC .......................................... 362/496–499, 501
See application file for complete search history.

(56) References Cited

FOREIGN PATENT DOCUMENTS

| | | |
|---|---|---|
| CN | 203780404 U | 8/2014 |
| CN | 203783248 U | 8/2014 |

(Continued)

OTHER PUBLICATIONS

"Honda—Civic Back Door Handle" (English version), dated of when search was conducted Feb. 8, 2018 <https://www.a2mac1.com/AutoReverse/default.asp?c=1&p=2#/product/827/part/9453>.

*Primary Examiner* — Jason M Han
(74) *Attorney, Agent, or Firm* — McGinn IP Law Group, PLLC

(57) ABSTRACT

A back door handle device is provided above a license plate of a back door of a vehicle and serves as both a license lamp and a handle switch. The back door handle device includes a light emitting element, a switch that outputs a signal for unlocking or locking the back door, a housing that houses the light emitting element and the switch, and an outer cover that covers the housing and includes an integrally molded article. The integrally molded article includes a transparent portion formed of a material that transmits light emitted from the light emitting element, and an elastic portion covering an outer side of the transparent portion. The transparent portion includes a lens portion that extracts light emitted from the light emitting element. The elastic portion includes a switch cover portion that is applied with a pushing force from an outside for outputting the signal.

4 Claims, 8 Drawing Sheets

(51) Int. Cl.
*F21S 43/27* (2018.01)
*B60J 5/10* (2006.01)

(56) References Cited

FOREIGN PATENT DOCUMENTS

| | | |
|---|---|---|
| CN | 208630471 U | 3/2019 |
| JP | 2007-001524 A | 1/2007 |
| JP | 2009-110867 A | 5/2009 |

BACK DOOR HANDLE DEVICE

CROSS-REFERENCE TO RELATED APPLICATION

This application claims priority from Japanese Patent Application No. 2018-225106, filed on Nov. 30, 2018, the entire subject matter of which is incorporated herein by reference.

TECHNICAL FIELD

The present invention relates to a back door handle device.

BACKGROUND ART

There has been known a technique of integrating a license lamp and a handle switch for unlocking or locking a back door. The license lamp and the handle switch are attached to an inner side of a back door garnish of an automobile (see, for example, JP-A-2007-001524).

By integrating the license lamp and the handle switch for unlocking or locking the back door, the overall size can be reduced as compared with a case of providing them separately. If the size can be reduced, an occupied space in the back door garnish can be reduced, so as to secure an installation space of other components, and a degree of freedom of installation positions of the respective components can be improved.

In a vehicle rear hatch structure described in JP-A-2007-001524, an LED lamp is covered with a transparent cover formed of resin in order to extract light from the LED lamp as a light source of a license lamp. A micro switch for unlocking the back door protrudes out of the transparent cover and is actuated when directly pressed by the operator. Alternatively, the micro switch is accommodated in the transparent cover, and when the operator presses a push button protruding out of the transparent cover, the micro switch is pressed and actuated via the push button.

Further, there has been known a switch device attached to a back door panel of a vehicle in which a switch case that accommodates a switch for unlocking the back door is provided integrally with a waterproof cover formed of an elastic resin such as an elastomer, by insert molding (see, for example, JP-A-2009-110867).

In the switch device described in JP-A-2009-110867, an operation member accommodated in the switch case is in contact with an inner side of the waterproof cover, and when the operator presses the operation member via the waterproof cover having elasticity, a contact mechanism in the switch case operates to actuate the switch.

SUMMARY

However, there has been not known a back door handle device in which a license lamp and a handle switch are integrated and a surface is covered with an elastic material. Further, in order to manufacture such back door handle device, if respective components are simply assembled, the number of components and the number of manufacturing steps are increased, which causes a problem in cost and size.

Accordingly, an aspect of the present invention provides a back door handle device in which a license lamp and a handle switch are integrated and a surface is covered with an elastic material, and which has a structure capable of achieving manufacturing cost reduction and size reduction.

According to an embodiment of the present invention, there is provided a back door handle device as follows.

A back door handle device is configured to be provided above a license plate of a back door of a vehicle and serve as both a license lamp configured to illuminate the license plate and a handle switch configured to unlock or lock the back door. The back door handle device includes: a light emitting element that is configured to serve as a light source of the license lamp; a switch that is configured to output a signal for unlocking or locking the back door; a housing that houses the light emitting element and the switch; and an outer cover that covers an outer side of the housing and includes an integrally molded article including: a transparent portion formed of a material that transmits light emitted from the light emitting element; and an elastic portion formed of a material having elasticity and covering an outer side of the transparent portion. The transparent portion includes a lens portion configured to extract light emitted from the light emitting element. The elastic portion includes a switch cover portion that is a portion configured to be applied with a pushing force from an outside for outputting the signal from the switch.

In the above back door handle device, a surface of the outer cover that is in contact with the back door may be configured by the elastic portion.

In the back door handle device, the outer cover may include the integrally molded article including the transparent portion, the elastic portion and a metal collar fitted into an attachment hole for fixing the outer cover with a bolt.

In the above back door handle device, the outer cover may include the integrally molded article including the transparent portion and the elastic portion.

According to the above configuration, a back door handle device can be provided in which a license lamp and a handle switch are integrated and a surface is covered with an elastic material, and which has a structure capable of achieving manufacturing cost reduction and size reduction.

DESCRIPTION OF EMBODIMENTS

Embodiment

Figure 1:
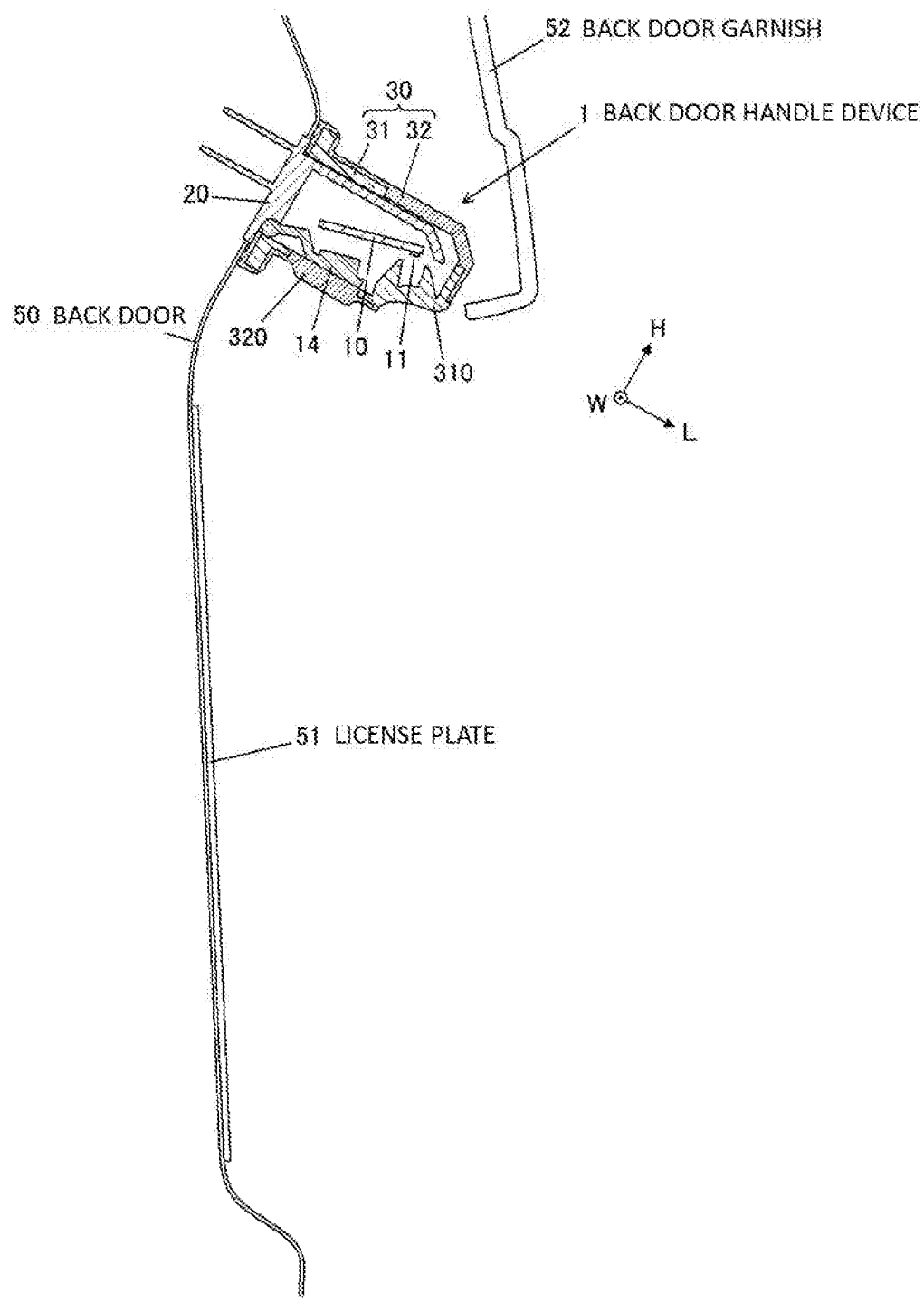
FIG. 1 is a vertical cross-sectional view of a back door in which a back door handle device according to an embodiment of the present invention is installed.

An embodiment of the present invention will be described below with reference to the accompanying drawings. Directions W, L and H shown in the drawings indicate a width direction of a back door handle device 1, a length direction of the back door handle device 1, and a height direction of the back door handle device 1, respectively. The W direction, the L direction and the H direction are common in the respective drawings.

(Overall Structure of Back Door Handle Device)

FIG. 1 is a vertical cross-sectional view of a back door 50 in which the back door handle device 1 according to the embodiment of the present invention is installed.

The back door 50 is a door provided on a rear surface of a vehicle such as an automobile and is also referred to as a rear hatch or a tailgate. A license plate 51 is attached to the back door 50.

A back door garnish 52 is attached above the license plate 51 of the back door 50, and the back door handle device 1, which serves as both a license lamp that irradiates the license plate 51 with light and a handle switch for opening and closing the back door 50, is installed on an inner side of the back door garnish 52 (a space between the back door 50 and the back door garnish 52).

Figure 2A:
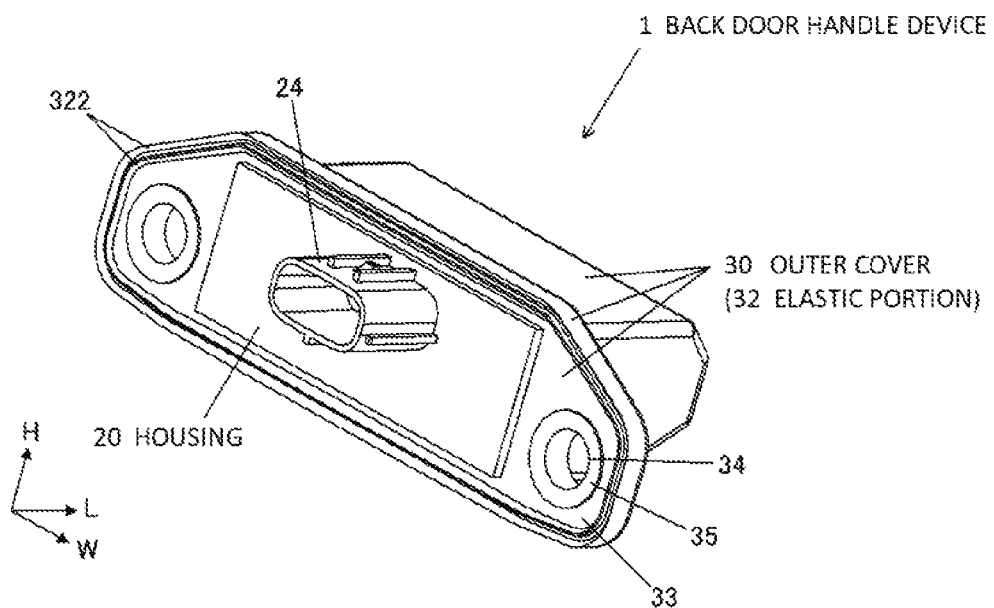
FIGS. 2A and 2B are perspective views of the back door handle device according to the embodiment of the present invention.
Figure 2B:
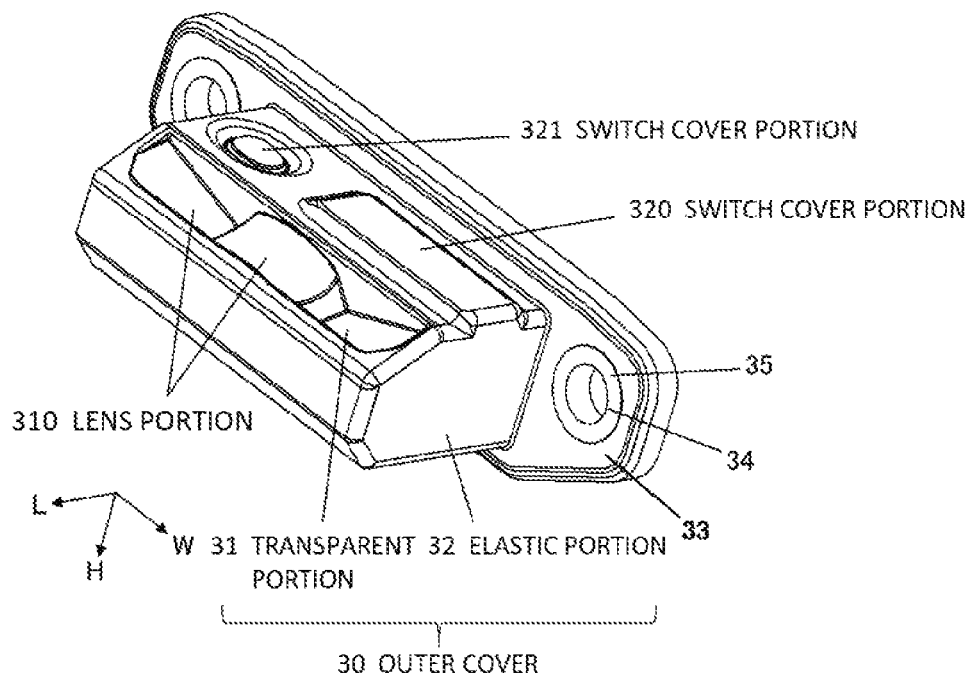

FIGS. 2A and 2B are perspective views of the back door handle device 1 according to the embodiment of the present invention. FIG. 2A is a perspective view of the back door handle device 1 as viewed from a front upper side of the vehicle, and FIG. 2B is a perspective view of the back door handle device 1 as viewed from a rear lower side of the vehicle.

Figure 3:
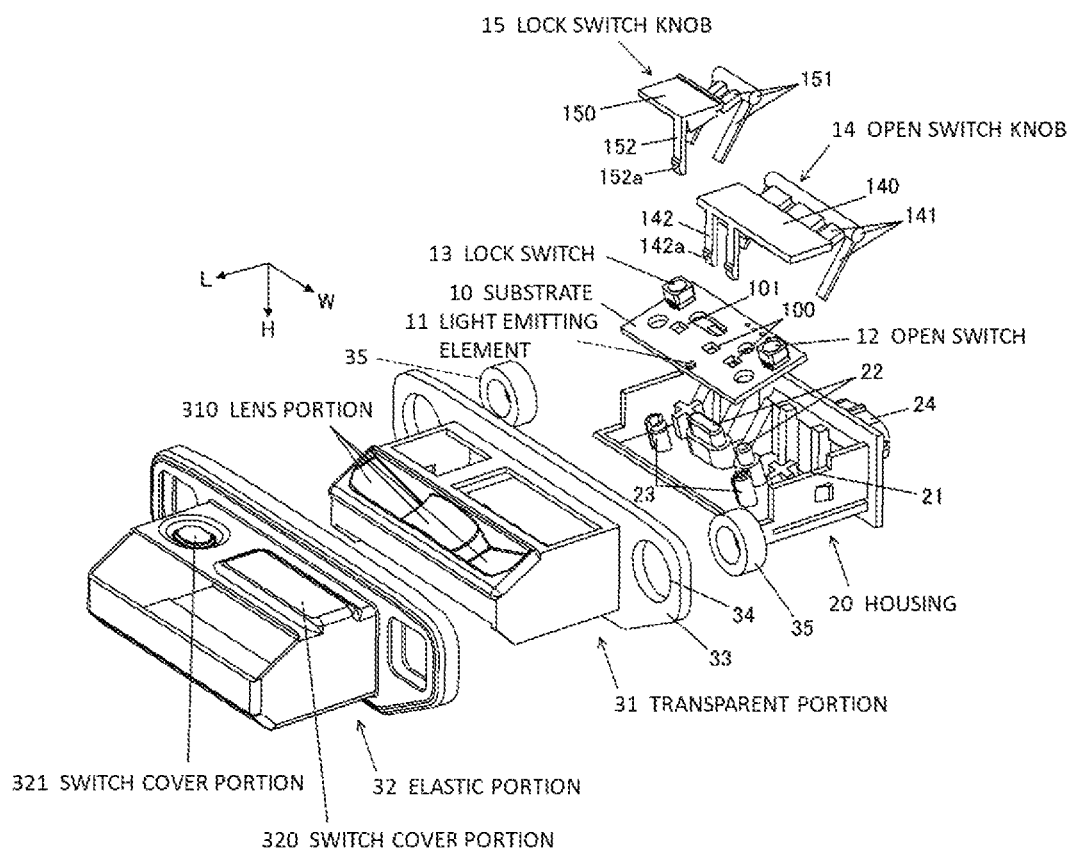
FIG. 3 is an exploded perspective view of the back door handle device according to the embodiment of the present invention.

FIG. 3 is an exploded perspective view of the back door handle device 1 according to the embodiment of the present invention.

The back door handle device 1 includes a light emitting element 11 serving as a light source of the license lamp, an open switch 12 that outputs a signal for unlocking the back door 50, a lock switch 13 that outputs a signal for locking the back door 50, a substrate 10 on which the light emitting element 11, the open switch 12 and the lock switch 13 are mounted, an open switch knob 14 for supplementing an actuation force of the open switch 12 (a force that opposes an external force for pushing the switch), a lock switch knob 15 for supplementing an actuation force of the lock switch 13, a housing 20 housing the substrate 10, the light emitting element 11, the open switch 12, the lock switch 13, the open switch knob 14 and the lock switch knob 15, and an outer cover 30 that covers an outer side of the housing 20.

The substrate 10 is a wiring substrate having wiring connected to electrodes of the light emitting element 11, the open switch 12 and the lock switch 13. The light emitting element 11, the open switch 12 and the lock switch 13 may be mounted separately on a plurality of substrates, but are preferably installed on the same substrate 10 in order to reduce the size, reduce the number of components to lower the cost, and reduce the number of assembly steps of the back door handle device 1.

The light emitting element 11 is preferably provided on the rear side of the vehicle than the open switch 12 and the lock switch 13. Accordingly, a lens portion 310 (described below) which is a light extraction portion of the back door handle device 1, and a switch cover portion 320 and a switch cover portion 321 (described below) which are operation portions of the handle switch for opening and closing the back door can be overlapped one another in a vehicle width direction. Therefore, a position of the operation portions of the handle switch can be easily specified with light as a guide mark.

Since the light emitting element 11 is disposed on the rear side of the vehicle, in a case where a camera is installed in the back door garnish 52, a light shielding range of the light emitted from the back door handle device 1 due to the camera can be narrowed, so that the camera can be disposed closer to the back door handle device 1. That is, the camera can be disposed at a position closer to a center in the vehicle width direction of the back door 50, which has good visibility.

Although not shown, a cable with a connector is connected to the substrate 10, and the light emitting element 11, the open switch 12, the lock switch 13 and an external device (a power supply device, an unlocking device, a locking device, and the like) are connected via the cable with the connector.

The housing 20 has an opening 21 on the vehicle lower side in order to pass the light emitted from the light emitting element 11 and to operate the open switch 12 and the lock switch 13 from the outside. The substrate 10, the open switch knob 14 and the lock switch knob 15 are installed on an inner surface on a vehicle upper side of the housing 20. The housing 20 has a cable port 24 for passing the cable with a connector connected to the substrate 10.

The outer cover 30 is an integrally molded article formed by insert molding or the like and including: a transparent portion 31 formed of a material that transmits light emitted from the light emitting element 11; and an elastic portion 32 formed of a material having elasticity and covering an outer side of the transparent portion 31.

The transparent portion 31 is formed of a material having a property of transmitting light emitted from the light emitting element 11, such as polycarbonate or acryl. The transparent portion 31 includes, on the vehicle lower side of the outer cover 30, the lens portion 310 for extracting light emitted from the light emitting element 11 while expanding an emission range in the vehicle width direction.

A portion of the elastic portion 32 overlapping the lens portion 310 is opened to extract light from the lens portion 310.

The outer cover 30 has an attachment portion 33 having attachment holes 34 for bolt fixing, which are for attaching the back door handle device 1 to the back door 50. The attachment portion 33 is provided in a portion of the outer cover 30 that comes into contact with the back door 50, and includes a portion extending in the vehicle width direction from a main body portion covering the housing 20 of the transparent portion 31, and an outer cover 30 covering the surface thereof.

As shown in FIG. 2, metal collars 35 are preferably fitted in the attachment holes 34. If a bolt formed of metal is directly tightened to the attachment portion 33, deformation due to thermal creep may occur. In this case, abnormal noise may occur due to rattling of the back door handle device 1 attached to the back door 50, or a gap may be formed between the outer cover 30 and an attachment surface of the back door 50, which deteriorates waterproof property (described below). By using the metal collars 35 and fastening bolts to the metal collars 35, thermal creep of the attachment portion 33 can be reduced or prevented. The metal collars 35 may be formed integrally with the transparent portion 31 and the elastic portion 32 by insert molding or the like.

The elastic portion 32 is formed of, for example, a thermo plastic elastomer (TPE). The elastic portion 32 has a switch cover portion 320 and a switch cover portion 321 on the vehicle lower side of the outer cover 30. The switch cover portion 320 is a portion to which an operator applies a pushing force from the outside when unlocking the back door 50, that is, when a signal is output to the open switch 12. The switch cover portion 321 is a portion to which an operator applies a pushing force from the outside when locking the back door 50, that is, when a signal is output to the lock switch 13.

The portion of the transparent portion 31 overlapping the switch cover portion 320 and the switch cover portion 321 is open such that the switch cover portion 320 and the switch cover portion 321 contact with the open switch 12 and the lock switch 13, respectively.

A surface of the outer cover 30 that is in contact with the back door 50 is configured by the elastic portion 32. Since the elastic portion 32 having elasticity is in close contact with the attachment surface of the back door 50, water can be reduced or prevented from entering the housing 20.

In order to further enhance waterproof performance of the outer cover 30, an annular projection 322 surrounding a surface of the housing 20 in contact with the back door 50 is preferably provided on a part of the elastic portion 32 in contact with the attachment surface of the back door 50. When the back door handle device 1 is attached to the back door 50, the projection of the elastic portion 32 is pressed against the back door 50 and thereby compressed or bent, so as to be in firm and close contact with the back door 50. In particular, when the projection of the elastic portion 32 is bent and its side surface comes into close contact with the attachment surface of the back door 50, stronger waterproof property can be obtained.

Since the transparent portion 31 serves as both a resin portion of the outer cover and a lens, and the transparent portion 31 and the elastic portion 32 can be integrally formed by insert molding or the like, the number of components and the number of manufacturing steps of the back door handle device 1 can be reduced, which reduces the manufacturing cost and reduces the size thereof.

The outer cover 30 may include a portion formed of a material different from the transparent portion 31 and the elastic portion 32, but in order to reduce the manufacturing cost, the outer cover 30 preferably can be formed integrally including the transparent portion 31 and the elastic portion 32.

Figure 4A:
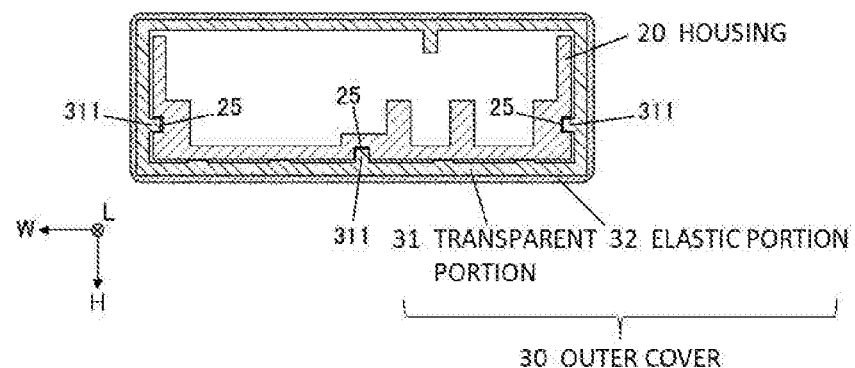
FIGS. 4A and 4B are cross-sectional views of a housing and an outer cover.
Figure 4B:
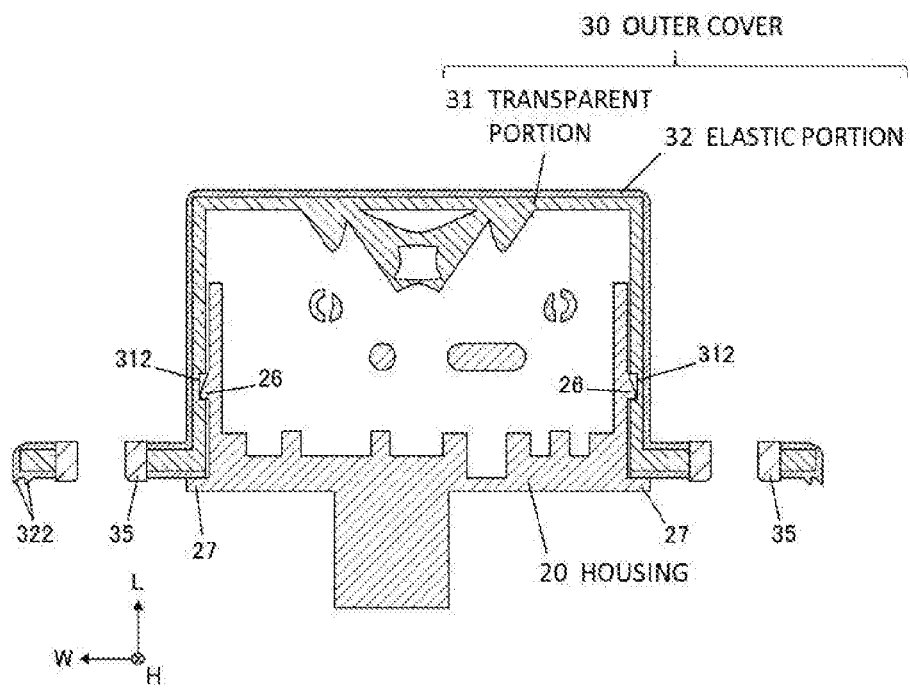

FIGS. 4A and 4B are cross-sectional views of the housing 20 and the outer cover 30. As shown in FIG. 4A, the housing 20 and the transparent portion 31 of the outer cover 30 preferably have recesses 25 and protrusions 311 that are fitted to one another, respectively.

By providing the recesses 25 along the length direction (L direction) on side surfaces of the housing 20 and the protrusions 311 fitted thereto, the housing 20 can be positioned in the height direction (H direction) when assembling the housing 20 to the outer cover 30. Moreover, by providing the recess 25 along the length direction (L direction) on a bottom surface of the housing 20 and the protrusion 311 fitted thereto, the housing 20 can be positioned in the width direction (W direction) when assembling the housing 20 to the outer cover 30. Further, by providing the protrusions 311, a cross-sectional coefficient of the transparent portion 31 can be improved, so that rigidity thereof can be improved.

As shown in FIG. 4A, the housing 20 and the transparent portion 31 of the outer cover 30 preferably have claws 26 and grooves 312 for receiving the claws 26, respectively. The claws 26 are provided, for example, on the side surfaces of the housing 20. By providing the claws 26 and the grooves 312, the housing 20 can be positioned in the length direction (L direction) when assembling the housing 20 to the outer cover 30, and the housing 20 and the outer cover 30 can be prevented from separating after assembly.

As shown in FIG. 4B, by providing the housing 20 with stoppers 27 on edges of the opening of the outer cover 30 for inserting the housing 20, the housing 20 can be positioned in the length direction (L direction) when assembling the housing 20 to the outer cover 30.

Figure 5A:
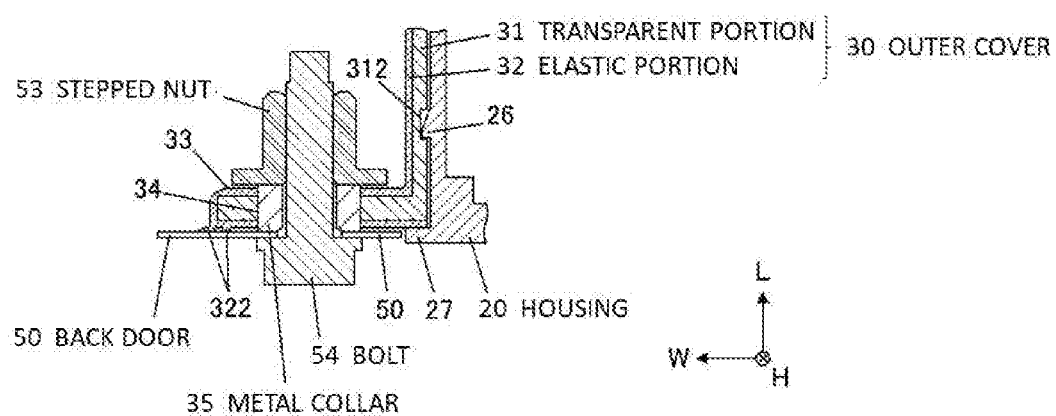
FIGS. 5A and 5B are enlarged cross-sectional views of a periphery of an attachment portion of a back door handle device in a state of being attached to a back door.
Figure 5B:
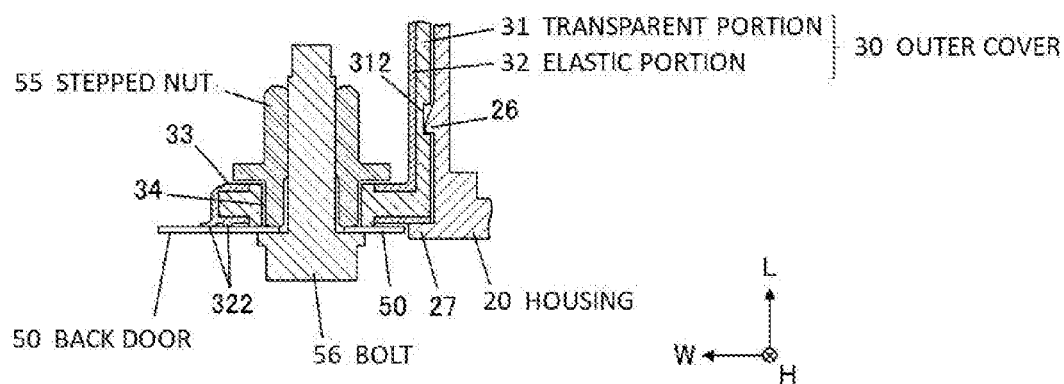

FIGS. 5A and 5B are enlarged cross-sectional views of a periphery of the attachment portion 33 of the back door handle device 1 in a state of being attached to the back door 50.

FIG. 5A shows an example of an attachment state in a case where the back door handle device 1 has the metal collar 35. In this case, the metal collar 35 fitted into the attachment hole 34 and the back door 50 is fixed by a stepped nut 53 and a bolt 54.

FIG. 5A shows an example of an attachment state in a case where the back door handle device 1 does not have the metal collar 35. In the example shown in FIG. 5B, the outer cover 30 is formed of an integrally molded article of the transparent portion 31 and the elastic portion 32, and the transparent portion 31 in the vicinity of the attachment holes 34 is in contact with the back door 50 without being covered by the elastic portion 32. The stepped nut 55 and the bolt 56 preferably fix the back door 50 from both sides without contacting the attachment portion 33. Accordingly, deformation due to thermal creep of the attachment portion 33 can be reduced or prevented without using the metal collar 35.

When the metal collar 35 is not used in the back door handle device 1, there is no risk of breakage of the attachment portion 33 due to a stress generated in a fixing portion between the metal collar 35 and the attachment hole 34. On the other hand, in a case where the stepped nut 55 and the bolt 56 are not in contact with the attachment portion 33 as described above, a gap may occur between the back door 50 and the attachment portion 33. Therefore, it may be important to improve waterproof property with the projection 322 of the elastic portion 32.

(Configuration Related to License Lamp Function)

The back door handle device 1 includes the light emitting element 11 that emits light and the lens portion 310 of the transparent portion 31 of the outer cover 30 for a license lamp function. In the back door handle device 1, the light emitted from the light emitting element 11 is extracted via the lens portion 310 so as to illuminate the license plate 51.

Typically, an LED is used as the light emitting element 11. The LED is a small light emitting element having small power consumption, small heat generation amount, and long life, and thus is suitable for use as the light emitting element 11. The lens portion 310 is formed of a transparent material such as an acrylic resin.

Figure 6:
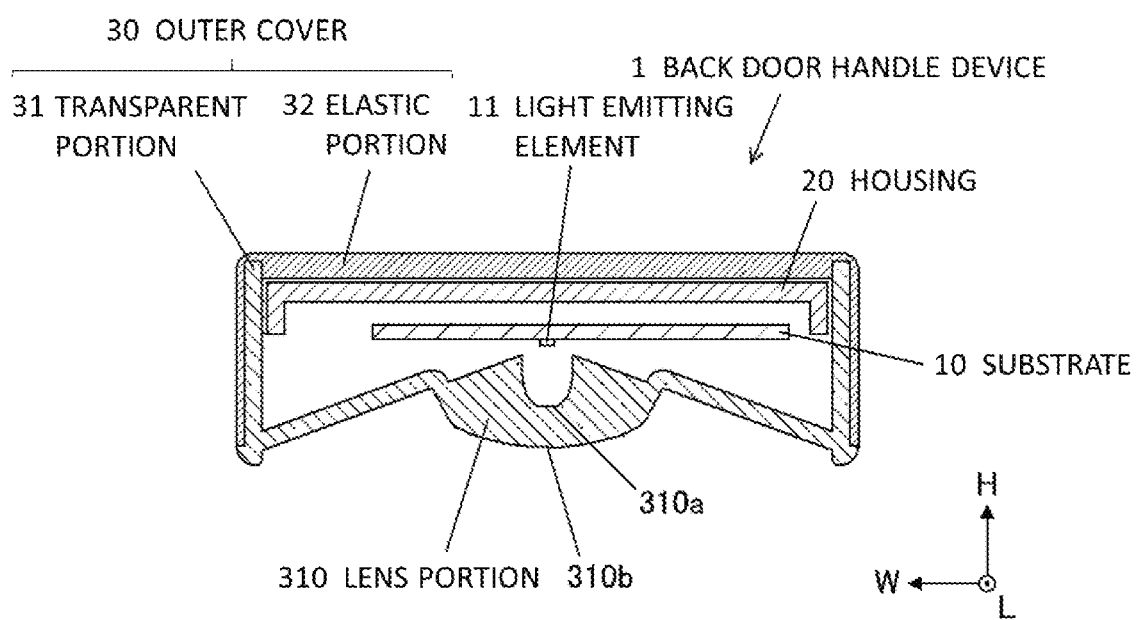
FIG. 6 is a cross-sectional view of the back door handle device including cross sections of a light emitting element and a lens portion of an outer cover.

FIG. 6 is a cross-sectional view of the back door handle device 1 including cross sections of the light emitting element 11 and the lens portion 310 of the outer cover 30. As shown in FIG. 6, the lens portion 310 preferably includes a recess 310*a* provided on an inner surface of the outer cover 30, and a protrusion 310*b* provided on an outer surface of the outer cover 30 so as to cover the recess 310*a*. By refracting the light emitted from the light emitting element 11 with surfaces of the recess 310*a* and the protrusion 310*b*, the emission range in the vehicle width direction can be expanded. Further, by providing the recess 310*a* and the protrusion 310*b*, a cross-sectional coefficient of the lens portion 310 can be improved, so that rigidity thereof can be improved.

Accordingly, the number of light emitting element(s) 11 necessary for illuminating the license plate 51 at a desired brightness (brightness satisfying light distribution regulations) ca be reduced, and the size of the back door handle device 1 can be reduced. The number of the light emitting elements 11 included in the back door handle device 1 may be one.

(Configuration Relating to Handle Switch Function for Opening and Closing Back Door)

Figure 7A:
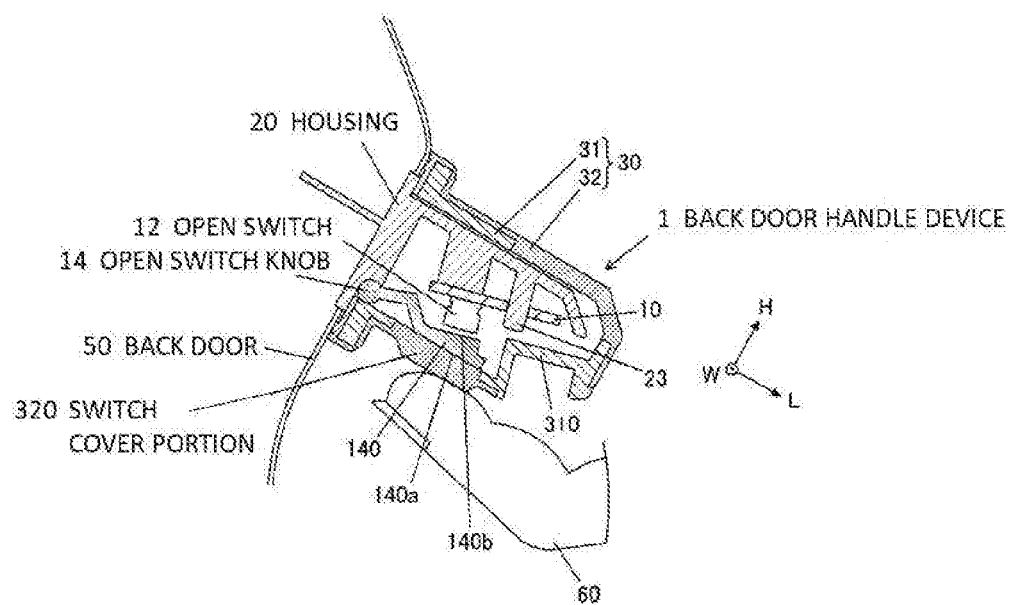
FIGS. 7A and 7B are vertical cross-sectional views of the back door handle device attached to the back door.
Figure 7B:
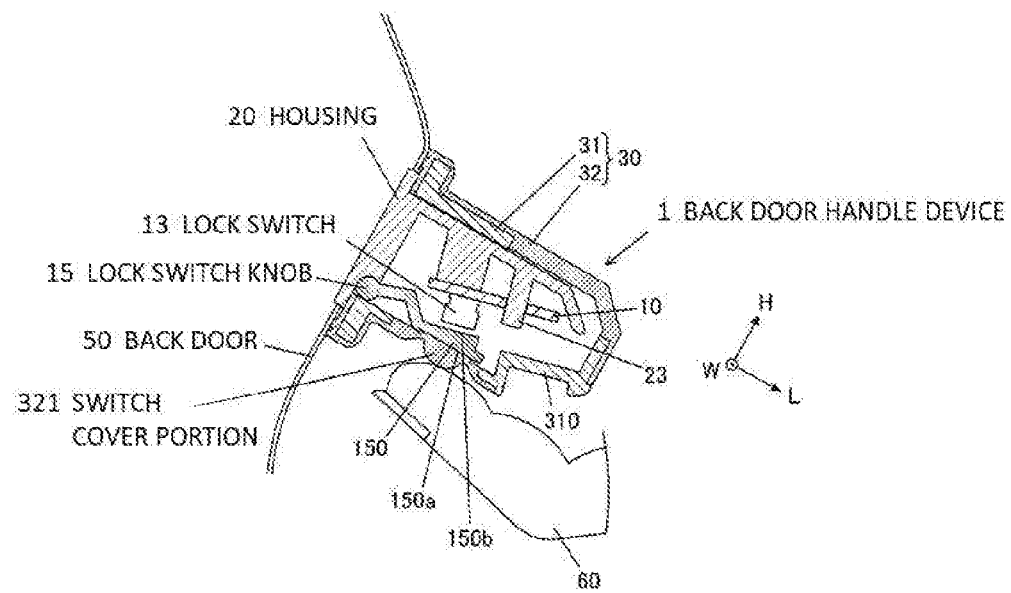

FIGS. 7A and 7B are vertical cross-sectional views of the back door handle device 1 attached to the back door 50. The cross-sectional view of FIG. 7A includes a cross section of the open switch 12 and the open switch knob 14, and the cross-sectional view of FIG. 7B includes a cross section of the lock switch 13 and the lock switch knob 15. In FIGS. 7A and 7B, illustration of the back door garnish 52 is omitted.

For the purpose of a handle switch function for opening and closing the back door, the back door handle device 1 includes the open switch 12 that outputs a signal for unlocking the back door 50 to an external locking device, the lock switch 13 that outputs a signal for locking the back door 50 to an external locking device, the open switch knob 14 for supplementing the actuation force of the open switch 12, the lock switch knob 15 for supplementing the actuation force of the lock switch 13, the switch cover portion 320 that is touched by a finger 60 of the operator upon unlocking operation of the back door 50, and the switch cover portion 321 that is touched by a finger 60 of the operator upon locking operation of the back door 50.

The open switch 12 and the lock switch 13 are push switches that output a contact signal (a signal indicating whether or not a contact is connected) when an internal contact is pressed to be electrically connected. When the contact signal output from the open switch 12 is input to the unlocking device, the unlocking device operates to unlock the back door 50. When the contact signal output from the lock switch 13 is input to the locking device, the locking device operates to lock the back door 50. In the back door handle device 1, instead of push switches, another type of switches such as electrostatic switches may be used as the open switch 12 and the lock switch 13.

Figure 8A:
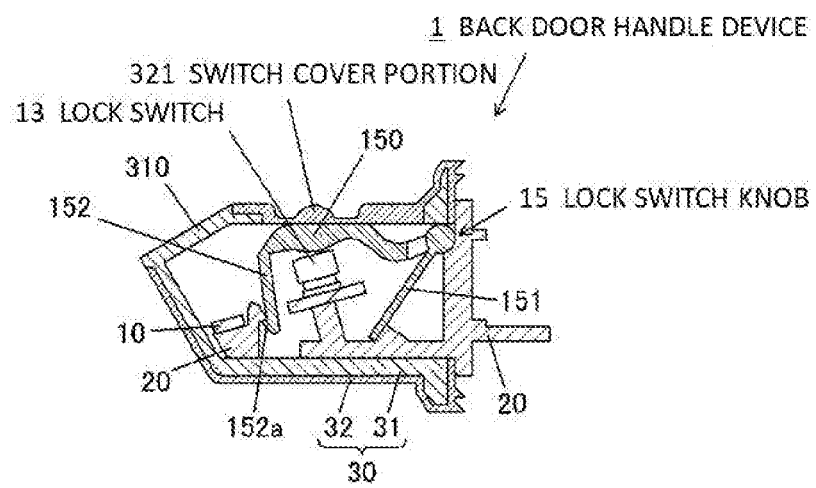
FIGS. 8A and 8B are vertical cross-sectional views showing a state of the back door handle device before and after a lock switch is pushed by the operator via a switch cover portion and a lock switch knob.
Figure 8B:
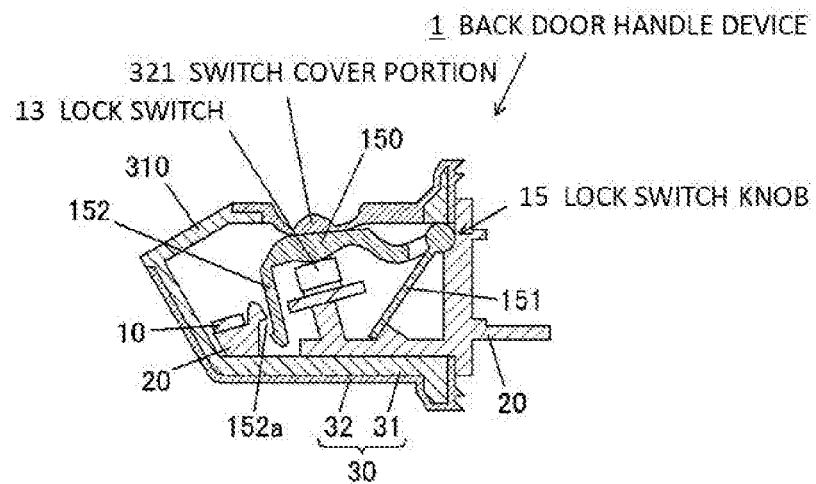

FIGS. 8A and 8B are vertical cross-sectional views showing a state of the back door handle device 1 before and after the lock switch 13 is pushed by the operator via the switch cover portion 321 and the lock switch knob 15. A state of the back door handle device 1 before and after the open switch 12 is pushed by the operator via the switch cover portion 320 and the open switch knob 14 is similar to that shown in FIGS. 8A and 8B.

The open switch knob 14 includes an operation portion 140 that moves from an initial position to a switch position upon pressing operation when unlocking the back door 50, a spring portion 141 that is elastically deformed and generates an elastic force in a direction returning the operation portion 140 to the initial position when the operation portion 140 moves from the initial position to the switch position, and a temporary fixing portion 142 for temporarily fixing the substrate 10, the light emitting element 11, the open switch 12, the lock switch 13, the open switch knob 14 and the lock switch knob 15 in the housing 20.

The operation portion 140, the spring portion 141 and the temporary fixing portion 142 are formed integrally. That is, the open switch knob 14 is an integrally molded article.

When the operator applies a pressing force to the switch cover portion 320 of the outer cover 30 from the outside and the operation portion 140 of the open switch knob 14 moves from the initial position to reach the switch position, the open switch 12 is pressed by the operation portion 140 to output the contact signal.

The operation portion 140 of the open switch knob 14 typically has a plate shape and has a first surface 140a facing the switch cover portion 320 side of the outer cover 30 and a second surface 140b facing the open switch 12 on the opposite side of the first surface 140a. When the operator presses the switch cover portion 320 at the time of unlocking the back door 50, the switch cover portion 320 presses the first surface 140a of the operation portion 140, and the second surface 140b of the operation portion 140 presses the open switch 12. When the operating portion 140 is in the initial position, the second surface 140b is in contact with the open switch 12 or is slightly away from the open switch 12.

A part of the spring portion 141 of the open switch knob 14 is in contact with an inner surface of the housing 20, and when the operator presses the operation portion 140 of the open switch knob 14 via the switch cover portion 320 when unlocking the back door 50, the spring portion 141 is pressed against the inner surface of the housing 20 and is deformed elastically, and an elastic force in a direction returning the operating portion 140 to the initial position is generated in the spring portion 141. The spring portion 141 is integral with the operation portion 140 and is formed by a rod-shaped member, a plate-shaped member, or a combination thereof.

By supplementing the actuation force of the open switch 12 by using the open switch knob 14 having the spring portion 141, even in a case where a small-sized push switch is used as the open switch 12, an appropriate operation load and click feeling can be obtained. As a result, both size reduction and appropriate operation load of the back door handle device 1 can be realized. The elastic force generated in the spring portion 141 can be appropriately adjusted via the shape, material, or the like of the spring portion 141. That is, a desired operation load can be realized by adjusting the shape, material, and the like of the spring portion 141.

The lock switch knob 15 includes an operation portion 150 that moves from an initial position to a switch position upon pressing operation when locking the back door 50, a spring portion 151 that is elastically deformed and generates an elastic force in a direction returning the operation portion 150 to the initial position when the operation portion 150 moves from the initial position to the switch position, and a temporary fixing portion 152 for temporarily fixing the substrate 10, the light emitting element 11, the open switch 12, the lock switch 13, the open switch knob 14 and the lock switch knob 15 in the housing 20.

The operation portion 150, the spring portion 151 and the temporary fixing portion 152 are formed integrally. That is, the lock switch knob 15 is an integrally molded article.

When the operator applies a pressing force to the switch cover portion 321 of the outer cover 30 from the outside and the operation portion 150 of the lock switch knob 15 moves from the initial position to reach the switch position, the lock switch 13 is pressed by the operation portion 150 to output the contact signal.

The operation portion 150 of the lock switch knob 15 typically has a plate shape and has a first surface 150a facing the switch cover portion 321 side of the outer cover 30 and a second surface 150b facing the lock switch 13 on the opposite side of the first surface 150a. When the operator presses the switch cover portion 321 at the time of locking the back door 50, the switch cover portion 321 presses the first surface 150a of the operation portion 150, and the second surface 150b of the operation portion 150 presses the lock switch 13. When the operating portion 150 is in the initial position, the second surface 150b is in contact with the lock switch 13 or is slightly away from the lock switch 13.

A part of the spring portion 151 of the lock switch knob 15 is in contact with an inner surface of the housing 20, and when the operator presses the operation portion 150 of the lock switch knob 15 via the switch cover portion 321 when locking the back door 50, the spring portion 151 is pressed against the inner surface of the housing 20 and is deformed elastically, and an elastic force in a direction returning the operating portion 150 to the initial position is generated in the spring portion 151. The spring portion 151 is integral with the operation portion 150 and is formed by a rod-shaped member, a plate-shaped member, or a combination thereof.

By supplementing the actuation force of the lock switch 13 by using the lock switch knob 15 having the spring portion 151, even in a case where a small-sized push switch is used as the lock switch 13, an appropriate operation load and click feeling can be obtained. As a result, both size reduction and appropriate operation load of the back door handle device 1 can be realized. The elastic force generated in the spring portion 151 can be appropriately adjusted via the shape, material, or the like of the spring portion 151. That is, a desired operation load can be realized by adjusting the shape, material, and the like of the spring portion 151.

In the example shown in FIG. 3, the temporary fixing portion 142 is a rod-shaped member having a claw 142a at a tip end thereof. The temporary fixing portion 142 is temporarily fixed to the housing 20 or the substrate 10. For example, the open switch knob 14 is temporarily fixed in the housing 20 by passing the tip end of the temporary fixing portion 142 through a hole 100 of the substrate 10 fixed to the housing 20 and hooking the claw 142a on a projection of the housing 20 or a surface on a rear side of the substrate 10 (a surface not facing the operation portion 140). In the example shown in FIG. 3, the temporary fixing portion 142 is temporarily fixed to the substrate 10.

The open switch knob 14 is preferably temporarily fixed by the temporary fixing portion 142 in a state in which the spring portion 141 is elastically deformed to a certain extent, that is, in a state in which the spring portion 141 is pressed against the inner surface of the housing 20.

In the example shown in FIGS. 3 and 8, the temporary fixing portion 152 is a rod-shaped member having a claw 152a at a tip end thereof. The temporary fixing portion 152 is temporarily fixed to the housing 20 or the substrate 10. The lock switch knob 15 is temporarily fixed in the housing 20 by passing the tip end of the temporary fixing portion 152 through a hole 101 of the substrate 10 fixed to the housing 20 and hooking the claw 152a on a projection of the housing 20 or a surface on a rear side of the substrate 10 (a surface not facing the operation portion 150). In the example shown in FIG. 3, the temporary fixing portion 142 is temporarily fixed to the substrate 10, and in the example shown in FIG. 8, the temporary fixing portion 142 is fixed to the housing 20.

The lock switch knob 15 is preferably temporarily fixed by the temporary fixing portion 152 in a state in which the spring portion 151 is elastically deformed to a certain extent, that is, in a state in which the spring portion 151 is pressed against the inner surface of the housing 20.

As shown in FIG. 3, the housing 20 preferably has ribs 22 for respectively abut against the second surface 140b of the open switch knob 14 (the surface facing the open switch 12 side of the operation portion 140) and the second surface 150b (a surface facing the lock switch 13 side of the operation portion 150) of the lock switch knob 15. The ribs 22 extend from the inner surface of the housing facing the second surface 140b and the second surface 150b toward the second surface 140b and the second surface 150b through holes 102 of the substrate 10.

In a case where the housing 20 has the ribs 22, when the operation portion 140 or the operation portion 150 reaches the switch position, the second surface 140b or the second surface 150b comes into contact with the tip end of one rib 22 or slightly away from the rib 22. Therefore, even when the operator presses the open switch knob 14 or the lock switch knob 15 with an excessive force, the second surface 140b or the second surface 150b abuts against the tip end of the rib 22, which reduces or prevents damage due to excessive deformation of the open switch knob 14 or the lock switch knob 15.

The number of the ribs 22 is not particularly limited, and a rib 22 for abutting against the second surface 140b of the open switch knob 14 and a rib 22 for abutting against the second surface 150b of the lock switch knob 15 may be provided separately. In order to reduce or prevent damage to the open switch knob 14 or the lock switch knob 15 more effectively, it is preferable to provide a plurality of ribs 22 that abut against both ends in the vehicle width direction or both ends and the vicinity of the centers in the vehicle width direction of the second surface 140b or the second surface 150b.

As shown in FIGS. 3 and 7, the housing 20 preferably has ribs 23 for abutting against an inner surface of the lens portion 310. The ribs 23 extend from the inner surface of the housing facing the inner surface of the lens portion 310 through holes 103 of the substrate 10, and tip ends thereof are in contact with the inner surface of the lens portion 310. In a case where the housing 20 has the ribs 23, since the lens portion 310 is supported by the ribs 23 from the inside, the lens portion 310 can be reduced or prevented from being damaged when a strong force is applied by mistake to the lens portion 310 by the operator.

In the back door handle device 1, the transparent portion 31 serves as both a resin portion of the outer cover and a lens, and thus has a resistance against external force of lens stronger than in a case where a resin portion of the outer cover is attached to a lens. By providing the ribs 23 therein, resistance against external force of lens can be further improved.

As shown in FIG. 7, the ribs 22 and the ribs 23 pass through the substrate 10, so that the ribs 22 and ribs 23 also function as positioning members of the substrate 10. Accordingly, by using both the functions of the ribs 22 and the ribs 23, the number of through holes provided in the substrate 10 can be reduced and deterioration in thermal conductivity of the substrate 10 can be reduced or prevented.

(Effect of Embodiment)

In the back door handle device 1 of the above embodiment, the transparent portion 31 of the outer cover 30 serves as both a resin portion of the outer cover and a lens, and the transparent portion 31 and the elastic portion 32 are integrally formed by insert molding or the like. Therefore, the number of components and the number of manufacturing steps of the back door handle device 1 can be reduced, which reduces the manufacturing cost and reduces the size thereof.

Although an embodiment of the present invention has been described above, the present invention is not limited to the above embodiments, and various modifications can be made without departing from the inventive concept of the present invention. For example, in the above embodiment, the back door handle device 1 includes both the open switch 12 and the lock switch 13, but the back door handle device 1 may include only one of them, and the other may be installed outside the back door handle device 1.

The embodiments described above do not limit the present invention recited in the claims. It should also be appreciated that not all combinations of the features described in the embodiments are essential to the means for solving the problem of the present invention.

The invention claimed is:

1. A back door handle device configured to be provided above a license plate of a back door of a vehicle and serve as both a license lamp configured to illuminate the license plate and a handle switch configured to unlock or lock the back door, the back door handle device comprising:
   a light emitting element that is configured to serve as a light source of the license lamp;
   a switch that is configured to output a signal for unlocking or locking the back door;
   a housing that houses the light emitting element and the switch; and
   an outer cover that covers an outer side of the housing and includes an integrally molded article including:
      a transparent portion formed of a material that transmits light emitted from the light emitting element; and
      an elastic portion formed of a material having elasticity and covering an outer side of the transparent portion,
   wherein the transparent portion includes a lens portion configured to extract light emitted from the light emitting element, and
   wherein the elastic portion includes a switch cover portion that is a portion configured to be applied with a pushing force from an outside for outputting the signal from the switch.

2. The back door handle device according to claim 1, wherein a surface of the outer cover that is in contact with the back door is configured by the elastic portion.

3. The back door handle device according to claim 1, wherein the outer cover includes the integrally molded article including the transparent portion, the elastic portion and a metal collar fitted into an attachment hole for fixing the outer cover with a bolt.

4. The back door handle device according to claim 1, wherein the outer cover includes the integrally molded article including the transparent portion and the elastic portion.

* * * * *